(12) United States Patent
Goto (10) Patent No.: US 8,857,747 B2
(45) Date of Patent: Oct. 14, 2014

(54) FOOD PREPARATION DEVICE

(75) Inventor: Masaharu Goto, Seki (JP)

(73) Assignee: Kai R & D Center Co., Ltd., Gifu (JP)

( * ) Notice: Subject to any disclaimer, the term of this patent is extended or adjusted under 35 U.S.C. 154(b) by 400 days.

(21) Appl. No.: 13/374,758

(22) Filed: Jan. 10, 2012

(65) Prior Publication Data

US 2012/0180323 A1  Jul. 19, 2012

(30) Foreign Application Priority Data

Jan. 17, 2011 (JP) ................................. 2011-006709

(51) Int. Cl.
*A47J 43/25* (2006.01)

(52) U.S. Cl.
CPC ...................................... *A47J 43/25* (2013.01)
USPC ............................ 241/95; 241/168; 241/273.1

(58) Field of Classification Search
USPC ..................... 241/95, 273.1, 273.2, 168, 169; 407/29.1, 29.15
See application file for complete search history.

(56) References Cited

U.S. PATENT DOCUMENTS

| | | | | |
|---|---|---|---|---|
| 806,646 | A * | 12/1905 | Curry .......................... | 241/273.4 |
| 2,347,383 | A * | 4/1944 | Wiegratz ..................... | 241/89.1 |
| 6,315,224 | B1 * | 11/2001 | Holcomb et al. .............. | 241/93 |
| 6,318,652 | B1 * | 11/2001 | Liu ................................ | 241/95 |
| D467,473 | S * | 12/2002 | Kerr .............................. | D7/678 |
| D556,507 | S * | 12/2007 | Chan ............................. | D7/391 |
| 7,469,848 | B2 * | 12/2008 | Yamanaka et al. ............. | 241/95 |
| 8,308,091 | B2 * | 11/2012 | Kent ............................. | 241/95 |
| 2004/0247403 | A1 * | 12/2004 | Grace et al. ................ | 407/29.15 |
| 2010/0012758 | A1 * | 1/2010 | Chalfant et al. ............... | 241/95 |
| 2010/0252669 | A1 * | 10/2010 | Romano ..................... | 241/273.2 |
| 2011/0079670 | A1 * | 4/2011 | Ameli et al. .................. | 241/95 |
| 2012/0085850 | A1 * | 4/2012 | Tetreault .................... | 241/101.2 |

FOREIGN PATENT DOCUMENTS

| | | |
|---|---|---|
| JP | 35-28924 | 11/1960 |
| JP | 52-017017 | 4/1977 |
| JP | 58-17570 | 4/1983 |
| JP | 60-029971 | 9/1985 |

* cited by examiner

*Primary Examiner* — Faye Francis
(74) *Attorney, Agent, or Firm* — Jordan and Hamburg LLP (57) ABSTRACT

A food preparation plate is replaceable and engagement means for retaining the food preparation plate are present between the food preparation plate and a retaining part. The food preparation plate can move in translation in a direction perpendicular to a plane constituted by the retaining part. Two places on the back side of the food preparation plate that is retained in the retaining part can be simultaneously pressed in the direction of the front side by the digits of different hands; and by simultaneously pressing those two places with digits of different hands, the food preparation plate is moved in translation in the direction of the front side thereof, so as to release the engagement means and allow the food preparation plate to be detached.

12 Claims, 11 Drawing Sheets

FOOD PREPARATION DEVICE

BACKGROUND OF THE INVENTION

The present invention relates to a food preparation device for preparing foods such as vegetables and cheeses in various forms.

Food preparation devices having handles, which serve to prepare foods in various forms include, for example, graters, slicers and shredders. There are also many food preparation devices with which various types of food preparation can be performed with one device, by way of detachably attaching replaceable blade plates bearing food preparation blades. One example of such replaceable blade type food preparation devices is configured so that the blade plate itself, in the form of a food preparation plate on which food preparation blades are directly formed, can be replaced, as is described in Patent Document 1. If the blade plate is a metal plate, the food preparation blades are formed as part of this metal plate, and if the blade plate is made of plastic, the food preparation blades are formed united with this plastic plate, and these blade plates, which are food preparation plates, are replaceable. Furthermore, another example of a replaceable blade type food preparation device is configured such that a blade plate bearing food preparation blades is assembled into a food preparation plate by way of fixing this in a frame member made of plastic or the like, and replacing the blade plate by way of detachably attaching this food preparation plate on the food preparation device.

With a replaceable blade type food preparation device, when the food preparation plate is replaced, the food preparation plate that has been mounted is first removed from the main body of the food preparation device by hand, and next, another food preparation plate is attached to the main body of the food preparation device by hand. Here, because the food preparation blades on the food preparation plate are exposed, if, for example, the work is difficult or the operator's hands are wet, there is a risk of injury on the food preparation blades.

Notably, in order to improve the efficiency of the grating work, graters have conventionally been such that food preparation blades are provided over substantially the entire food preparation surface, on which the food is placed and moved. Accordingly, if a replaceable blade system is used for a grater of this sort, the food preparation plate occupies the majority of the area other than the handle in the food preparation device, and a multiplicity of food preparation blades are provided over substantially the entire surface of the food preparation plate. Thus, the food preparation blades are exposed over a wide area, which is dangerous in so much as fingers or the like can easily come into contact with the food preparation blades when the food preparation plate is replaced.

The food preparation device described in Patent Document 3 is configured in such a way that a food preparation plate engages in a guide groove that is provided on the main body of the food preparation device, and the food preparation plate can be detachably replaced by sliding the food preparation plate in a direction that horizontally traverses the main body of the food preparation device. With a food preparation device having sliding system of this sort, the food preparation plate can be replaced relatively safely. But this is limited to food preparation devices having relatively small food preparation plates. Food preparation plates for graters that serve to grate large Japanese radish and the like must have a food preparation plate that is at least approximately 10 cm long and approximately 5 cm wide. If a sliding system is used for mounting and removal of the food preparation plate in a food preparation device having a food preparation plate of such a large size, it is not possible to rapidly mount the food preparation plate on the main body of the food preparation device. That is to say, when the food preparation plate is mounted on the main body of the food preparation device, the food preparation plate is disposed at the food preparation plate insertion opening in the food preparation device main body, in line with the slide direction thereof and, while maintaining this aligned state, the food preparation plate is inserted into the insertion opening. But because the food preparation plate is large, the work is difficult, and thus the food preparation plate cannot be mounted rapidly. This is because, when inserted, the food preparation plate that is held in a hand will tend to shake and therefore the work of fitting the food preparation plate into the food preparation plate insertion opening will take time. Furthermore, if the food preparation plate is large, the length over which this must slide is great, making it difficult to smoothly move the food preparation plate in translation, which prevents the food preparation plate from sliding smoothly, and thus the food preparation plate cannot be mounted rapidly.

PRIOR ART DOCUMENTS

Patent Document 1: JP-35-028924-U
Patent Document 2: JP-58-017570-U
Patent Document 3: JP-60-029971-U

SUMMARY OF THE INVENTION

The present invention is a replaceable food preparation plate type food preparation device, and an object thereof is to provide a food preparation device with which the food preparation plate can be replaced both safely and rapidly.

The present invention has a configuration comprising a food preparation device main body and a food preparation plate, wherein: the food preparation device main body includes a handle and a food preparation plate retaining device, the retaining device being attached to said handle and having a retaining part for detachably retaining the food preparation plate; the food preparation plate has food preparation blades on the front face thereof; engagement means for retaining the food preparation plate are present between food preparation plate and the retaining part; the food preparation plate can move in translation in a direction perpendicular to a plane constituted by the retaining part; two places on the back side of the food preparation plate that is retained in the retaining part can be simultaneously pressed in the direction of the front side by the digits of different hands; and by simultaneously pressing those two places with digits of different hands, the food preparation plate is moved in translation in the direction of the front side thereof, so as to release said engagement means and detach the food preparation plate.

Provided is a configuration comprising a food preparation device main body and a food preparation plate, wherein: the food preparation device main body includes a handle and a food preparation plate retaining device, the retaining device being attached to said handle and having a retaining part for detachably retaining the food preparation plate; the food preparation plate has food preparation blades on the front face thereof; engagement means for retaining the food preparation plate are present between food preparation plate and the retaining part; the food preparation plate can move in translation in a direction perpendicular to a plane constituted by the retaining part; when the food preparation plate is to be attached to the retaining part, with the back side of the food preparation plate and the retaining part facing each other, two places on the front side of the food preparation plate can be simultaneously pressed in the direction of the back side by the digits of different hands; and by simultaneously pressing those two places with digits of different hands, the food preparation plate is moved in translation in the direction of the back side thereof, so as to push the food preparation plate onto the retaining part, whereby the engagement means automatically retain the food preparation plate.

Provided is a configuration comprising a food preparation device main body and a food preparation plate, wherein: the food preparation device main body includes a handle and a food preparation plate retaining device, the retaining device being attached to said handle and having a retaining part for detachably retaining the food preparation plate; the food preparation plate has food preparation blades on the front face thereof; engagement means for retaining the food preparation plate are present between food preparation plate and the retaining part; the food preparation plate can move in translation in a direction perpendicular to a plane constituted by the retaining part; when the food preparation plate is to be attached to the retaining part, with the back side of the food preparation plate and the retaining part facing each other, the food preparation plate is moved in translation in the direction of the back side thereof, so as to push the food preparation plate onto the retaining part, whereby the engagement means automatically retain the food preparation plate, and when the food preparation device is viewed from the side, a line of extension that extends from top edge of the food preparation plate in the direction of the handle is higher than the handle.

Provided is a configuration comprising a food preparation device main body and a food preparation plate, wherein: the food preparation device main body includes a handle and a food preparation plate retaining device, the retaining device being attached to said handle and having a retaining part for detachably retaining the food preparation plate; the food preparation plate has food preparation blades on the front face thereof; engagement means for retaining the food preparation plate are present between food preparation plate and the retaining part; the food preparation plate can move in translation in a direction perpendicular to a plane constituted by the retaining part; when the food preparation plate is to be attached to the retaining part, with the back side of the food preparation plate and the retaining part facing each other, the food preparation plate is moved in translation in the direction of the back side thereof, so as to push the food preparation plate onto the retaining part, whereby the engagement means automatically retain the food preparation plate, and a cover that substantially entirely covers front face of a blade plate is detachably attached to the food preparation plate.

The food preparation plate can move in translation in a direction perpendicular to a plane constituted by the retaining part; two places on the back side of the food preparation plate that is retained in the retaining part can be simultaneously pressed in the direction of the front side by the digits of different hands; and by simultaneously pressing those two places with digits of different hands, the food preparation plate is moved in translation in the direction of the front side thereof, so as to release the engagement means and allow the food preparation plate to be detached. Because the food preparation plate can move in translation in a direction perpendicular to a plane constituted by the retaining part, when the food preparation plate is to be detached from the retaining part, the food preparation plate is moved in translation in the direction of the front side thereof, so as to release the engagement means and allow the food preparation plate to be detached. Accordingly, as contrasts with conventional sliding type food preparation devices in which the food preparation plate is detached by way of sliding the food preparation plate in a direction that horizontally traverses the food preparation device main body, with the present invention, the food preparation plate can be immediately detached by moving the food preparation plate in translation in the direction of the front side thereof, and therefore the food preparation plate can be detached extremely rapidly. Furthermore, because there are places for pressing the food preparation plate with the fingers, this can be removed safely, without the risk of touching the food preparation blades with the fingers when the food preparation plate is detached.

The food preparation plate can move in translation in a direction perpendicular to a plane constituted by the retaining part; when the food preparation plate is to be attached to the retaining part, with the back side of the food preparation plate and the retaining part facing each other, two places on the front side of the food preparation plate can be simultaneously pressed in the direction of the back side by the digits of different hands; and by simultaneously pressing those two places with digits of different hands, the food preparation plate is moved in translation in the direction of the back side thereof, so as to push the food preparation plate onto the retaining part, whereby the engagement means automatically retain the food preparation plate. Accordingly, as contrasts with conventional sliding type food preparation devices in which the food preparation plate is attached by way of sliding the food preparation plate in a direction that horizontally traverses the food preparation device main body, with the present invention, the food preparation plate can be immediately attached by moving the food preparation plate in translation in the direction of the back side thereof, and therefore the food preparation plate can be attached extremely rapidly. Furthermore, because there are places for pressing the food preparation plate with the fingers, this can be attached safely, without the risk of touching the food preparation blades with the fingers when the food preparation plate is attached.

The food preparation plate can move in translation in a direction perpendicular to a plane constituted by the retaining part; when the food preparation plate is to be attached to the retaining part, with the back side of the food preparation plate and the retaining part facing each other, the food preparation plate is moved in translation in the direction of the back side thereof, so as to push the food preparation plate onto the retaining part, whereby the engagement means automatically retain the food preparation plate; and when the food preparation device is viewed from the side, a line of extension that extends from top edge of the food preparation plate in the direction of the handle is higher than the handle. Provided is a configuration which, when the food preparation plate is to be attached to the retaining part, allows the food preparation plate to be attached to the retaining part by way of holding only the retaining part, and without touching the food preparation plate with the hands. That is to say, when the food preparation device is viewed from the side, a line of extension that extends from top edge of the food preparation plate in the direction of the handle is higher than the handle, and therefore when a food preparation device to which a food preparation plate has been attached is turned upside down and the food preparation plate is pressed against the surface of a countertop, there will be a gap between the surface of the countertop and the handle. Thus, when the food preparation plate is to be attached to the retaining part, the food preparation plate is first turned upside down and placed on the surface of a countertop or the like. Next, if, for example, the operator is right handed, the operator grips the handle in their right hand and places the index finger and the thumb of that hand on the retaining part. Next, the index finger and the thumb of the left hand are placed on the retaining part. Next, the retaining part is brought above the food preparation plate that has been placed upside down on the countertop, so as to face the food preparation plate. Next, force is applied to the retaining part so as to press the retaining part downwards, whereupon the retaining part moves downward in translation, without the handle coming into contract with the countertop, so that the food preparation plate is pushed onto the retaining part and the engagement means automatically retain the food preparation plate. The work of attaching the food preparation plate is completed by way of these operations. Accordingly, when the food preparation plate is to be attached to the retaining part, the food preparation plate can be attached to the retaining part safely and rapidly, simply by placing the food preparation part on a countertop or the like, without it being necessary to hold the food preparation plate in one's hands.

The food preparation plate can move in translation in a direction perpendicular to a plane constituted by the retaining part; when the food preparation plate is to be attached to the retaining part, with the back side of the food preparation plate and the retaining part facing each other, the food preparation plate is moved in translation in the direction of the back side thereof, so as to push the food preparation plate onto the retaining part, whereby the engagement means automatically retain the food preparation plate; and a cover that substantially entirely covers front face of a blade plate is detachably attached to the food preparation plate. Accordingly, the food preparation plate can be attached to, and detached from, the retaining part with the cover covering the food preparation blades. Furthermore, it is even safe to place the food preparation plate in the palm of the hand so that the surface of the cover comes into contact with the palm of the hand. Accordingly, when the food preparation plate is to be attached to the retaining part, with the retaining part facing the back face of the food preparation plate, which has been placed in the palm in this manner, by moving the retaining part of the food preparation device main body, which is held in the other hand, in translation in the direction of the food preparation plate, so as to push the food preparation plate onto the retaining part, the food preparation plate is automatically retained by the engagement means. Accordingly, the food preparation plate can be attached to the retaining part rapidly by way of translational motion. Furthermore, the food preparation plate can be safely attached to the retaining part by way of attaching the cover.

DESCRIPTION OF THE PREFERRED EMBODIMENTS

A mode of embodiment of the present invention will be described in accordance with the drawings. A food preparation device 1 illustrating the present mode of embodiment is primarily adapted for grating foods such as cheese. The food preparation device 1 comprises a food preparation device main body 2 and a food preparation plate 3. The food preparation plate 3 is replaceable, so that the food preparation plate 3 can be replaced when one wishes to grate, for example, cheese, to a different fineness. The food preparation device main body 2 comprises a handle 4 and a retaining device 5 for the food preparation plate 3. The handle 4 is given an elongate shape, in the manner of the handle of a kitchen knife. The length of the handle 4 is 112 mm, but it is not limited to this value. The cross-sectional shape of the handle is vertically asymmetrical (not shown in the drawing) so that the top side and bottom side of the food preparation device 1 can be determined without looking at the food preparation plate 3, simply by grasping the handle 4. However, if the sectional shape of the handle 4 were to be vertically symmetrical, this would not present a problem.

Figure 4:
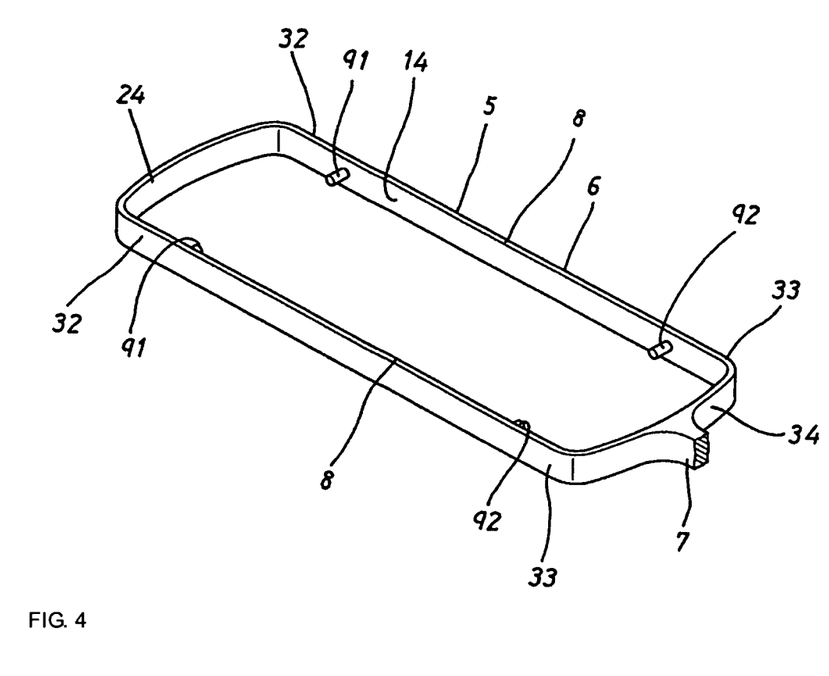
FIG. 4 is a perspective view of the retaining part of the present invention.

The retaining device 5 comprises a retaining part 6, which is formed as a substantially rectangular frame, and an insertion projection 7, which is provided at a rear end piece 34, which is the end piece of the retaining part 6 that is closest to the handle 4. The retaining part 6 and the insertion projection 7 are integrally formed from metal. The insertion projection 7 is inserted into the forward end of the handle 4, so as to join the retaining device 5 and the handle 4. Both side pieces 8, 8 of the retaining part 6 are straight, and both the forward and rear end pieces 24, 34 of the retaining part 6 form outwardly convex arches. The retaining part 6 is made from a metal strip having a smaller thickness, which is to say, transverse width, than the vertical width thereof. The retaining part 6 is not limited to a metal strip of this sort, and may, for example, have a cross-section that is substantially square or round, or this may be a metal piece with a transverse width that is greater than the vertical width. The material is not limited to metal, and this may also be plastic or the like. The vertical width of the retaining part 6 is approximately 10 mm and the thickness, which is to say the transverse width, is approximately 2 mm. The length of the inner face of the retaining part 6 is approximately 181 mm in the lengthwise direction, and approximately 60 mm in the crosswise direction. It is a matter of course that the size is not limited to these values. Furthermore, as shown in FIG. 4, a total of four sectionally circular engagement protrusions 91, 92 are provided at the forward portion and the rear portion of both side pieces 8, 8, in the center of the vertical width, on the inner faces thereof. Expressing the positions at which the engagement protrusions 91, 92 are provided as numerical values, the distances between the center lines of the two forward engagement protrusions 91, 91 and the center of the inner face of the forward end piece 24 of the retaining part 6 is approximately 30 mm. The distances between the center lines of the two rear engagement intrusions 92, 92 and the center of the inner face of the rear end piece 34 of the retaining part 6 is likewise approximately 30 mm. That is to say, the engagement protrusions 91, 92 are arranged symmetrically with respect to center lines extending in the lengthwise direction and crosswise direction of the retaining part 6. In the present invention, it is preferable that an even number of engagement protrusions be arranged symmetrically with respect to the center lines that extend in the lengthwise direction and crosswise direction of the retaining part 6, in this manner.

The food preparation plate 3 comprises a blade plate 10 and a frame member 11. The blade plate 10 is permanently joined to the frame member 11. The frame member 11 is integrally formed from plastic. The frame member 11 may also be made of materials other than plastic and, for example, this may be made from metals such as aluminum. When the food preparation plate 3 is attached to the retaining part 6, so that the outer peripheral face 13 of the frame member 11 and the inner peripheral face 14 of the retaining part 6 face each other with a slight gap therebetween, the rectangle constituted by the outer peripheral face 13 of the frame member 11 and the rectangle constituted by the inner peripheral face 14 of the retaining part 6 are similar in shape. Accordingly, as with the retaining part 6, both side pieces 15, 15 of the frame member 11 are straight, and the forward and rear end pieces 201, 202 thereof form outwardly convex arches. Furthermore, the external shape of the food preparation plate 3 is quadrilaterally symmetrical so that it can be attached to the retaining part 6, even if the forward/rear orientation of the food preparation plate 3 is reversed. However, it is a matter of course that the outer shape of the food preparation plate 3 is not so limited.

The thicknesses, which is to say, the traverse widths of both side pieces 15, 15 and both the forward and rear end pieces 201, 202, which constitute the frame member 11, are smaller than the vertical widths thereof. It is preferable that the traverse thickness of the frame member 11 not be thin in the manner of the retaining part 6, but rather that this have a traverse width of a predetermined size. In this mode of embodiment, the traverse widths of both side pieces 15, 15 and both the forward and rear end pieces 201, 202 of the frame member 11 are approximately 5.3 mm, which is 2 mm larger than the traverse width of the retaining part 6. Furthermore, the vertical widths of both side pieces 15, 15 and both the forward and rear end pieces 201, 202 of the frame member 11 are approximately 10 mm, which is substantially equal to the vertical width of the retaining part 6.

Figure 5:
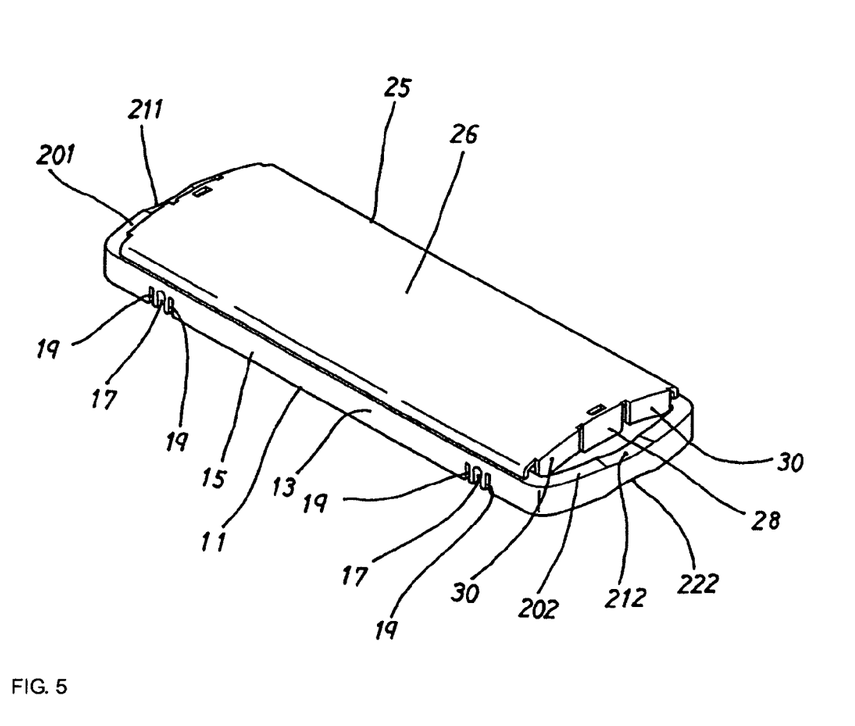
FIG. 5 is a perspective view of a food preparation plate with an attached cover.
Figure 8:
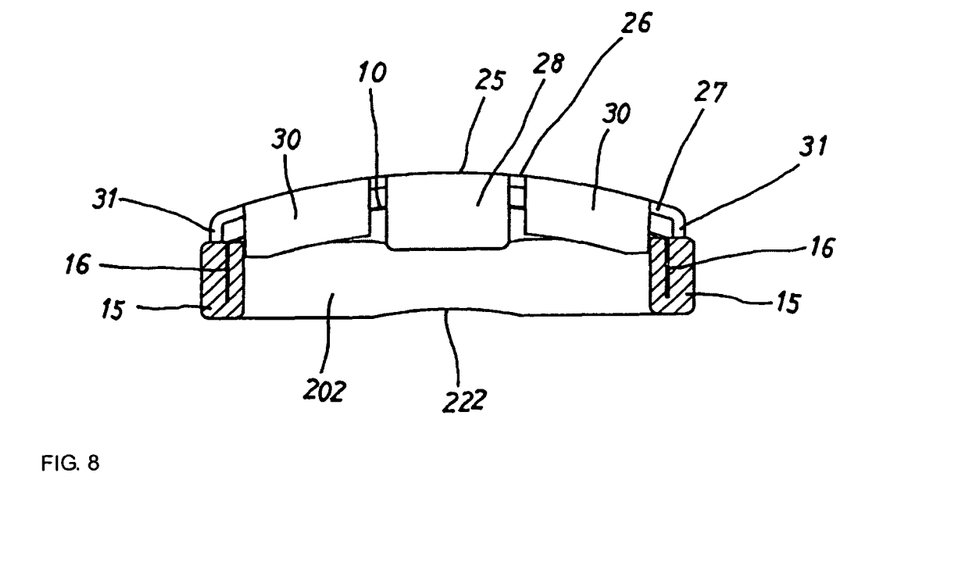
FIG. 8 is a transverse sectional view of the food preparation plate with the attached cover.
Figure 9:
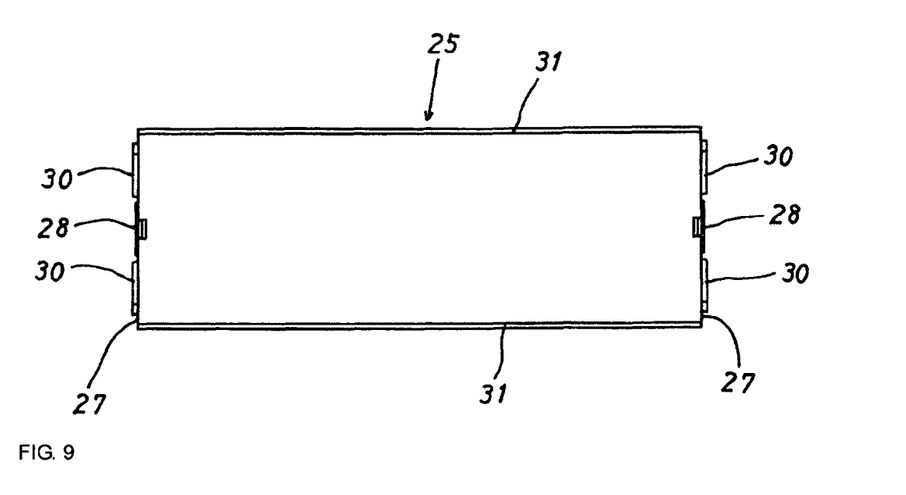
FIG. 9 is a back view of the cover.
Figure 10:
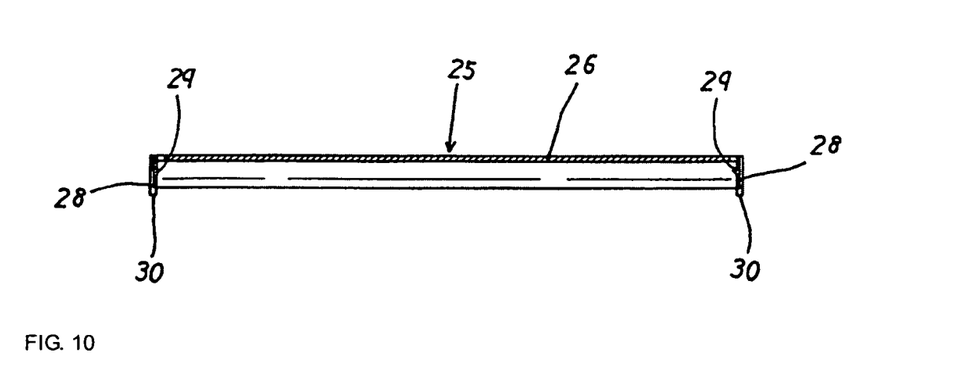
FIG. 10 is a view of a longitudinal sectional along the center of the cover.
Figure 11:
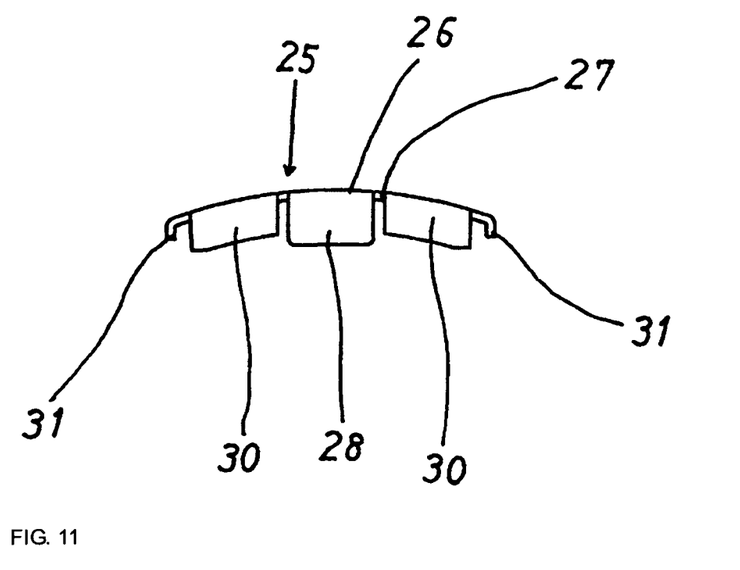
FIG. 11 is a forward end view of the cover.

As shown in FIG. 5, depressions 211, 212 are provided at the center of the front faces of both the forward and rear end pieces 201, 202 of the frame member 11. Furthermore, as shown in FIG. 5 and FIG. 8, depressions 221, 222 are also provided at the center of the back faces of both the forward and rear end pieces 201, 202. These depressions 211, 212, 221, 222 are provided to indicate the most desirable positions for pressing the food preparation plate 3 with a finger. Accordingly, places that can be pressed by a finger are not limited to these depressions, and in addition to the depressions 211, 212, 221, 222, a finger may be pressed against other places on the front or the back side of the frame member 11 that have not been worked in any way. Furthermore, even if depressions are not provided from the start, it suffices that two places against which fingers of different hands can be pressed at the same time be reserved, whereby it is possible to move the food preparation plate 3 in translation in a direction perpendicular to the plane constituted by the retaining part 6. The expression, two places against which fingers of different hands can be pressed at the same time refers to places in which there is no impediment to pressing, and excludes, for example, in cases where the food preparation blades are provided up to the vicinity of the periphery of the food preparation plate, places where, in pressing a finger at the periphery of the food preparation plate, one would necessarily press against a food preparation blade. It is preferable that the two places be point symmetrical places with respect to the center of the food preparation plate 3. It is, for example, preferable to provide places at the centers of the front and rear end pieces of the food preparation plate 3, as in this embodiment, or at the centers of both side pieces of the food preparation plate 3. The latter places are preferred in cases where the food preparation plate 3 is laterally elongate or square. Furthermore, these may be two places on diagonally opposite corners of the food preparation plate 3, or another two places. The configuration may be such that the operator can choose these places freely in accordance with the shape of the food preparation plate 3 or the manual habits of the operator. Note that, as described above, the traverse width of the frame member 11 is preferably a traverse width of a predetermined size, and is not thin in the manner of the retaining part 6. Accordingly, it will not be painful to press the fingertips against the front or the back of the frame member 11. However, it is a matter of course that the frame member 11 may also be formed with a narrow traverse width and, in this case, it is preferable that depressions be provided, and that the traverse widths be larger only in these depressions.

Figure 6:
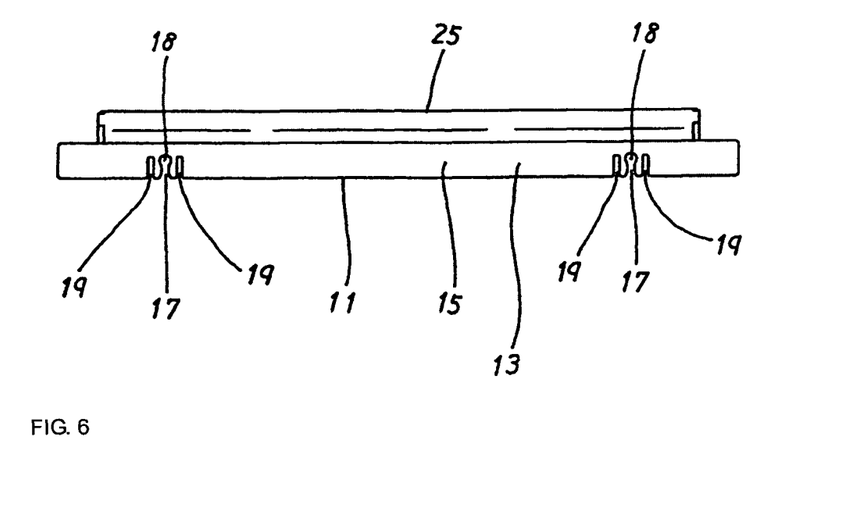
FIG. 6 is a side view of the food preparation plate with the attached cover.
Figure 7:
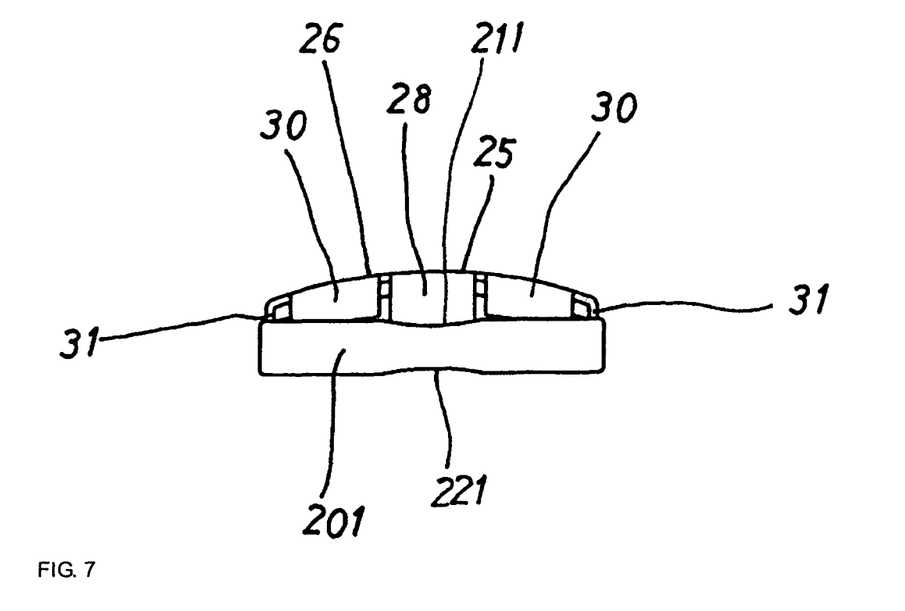
FIG. 7 is a forward end view of the food preparation plate with the attached cover.

As shown in FIG. 5 and FIG. 6, four engagement recesses 17 are formed as grooves at the forward portion and rear portion of both side pieces 15, 15 of the frame member 11, on the back faces thereof. These positions are in line with the positions of the engagement protrusions 91, 92, which are provided on the retaining part 6, as described above. A circular arch is formed at the bottoms 18 of these engagement recesses 17. This serves to stably engage the engagement protrusions 91, 92 at the bottoms 18 of the engagement recesses 17. Furthermore, by providing notches 19, 19 next to the engagement recesses 17, the engagement recesses 17, which are formed so as to have a width that is narrower than the width of the engagement protrusions 91, 92, can elastically expand, whereby the engagement protrusions 91, 92 can be smoothly engaged in the bottoms 18 of the engagement recesses 17. Furthermore, the bottom 18 of the engagement recess 17 is formed at the center of the vertical width of the frame member 11. Next, as described above, on the retaining part 6, a total of four engagement protrusions 91, 92 are provided at the forward and rear portions of both side pieces 8, 8, in the center of the vertical width, on the inner faces thereof. Furthermore, the vertical width of the retaining part 6 and the vertical width of the frame member 11 are substantially equal. Accordingly, when the food preparation plate 3 is retained in the retaining part 6 by engaging the engagement protrusions 91, 92 on the retaining part 6 in the bottoms 18 of the engagement recesses 17, the vertical width center of the retaining part 6 and the vertical width center of the frame member 11 coincide, and therefore the frame member 11 does not protrude beyond retaining part 6, either on the front side or the back side, and the outer periphery 13 of the frame member 11 and the inner periphery 14 of the retaining part 6 face each other over the entire surfaces thereof, with a slight gap therebetween. Moreover, because the vertical width center of the retaining part 6 and the vertical width center of the frame member 11 coincide, the food preparation plate 3 can be attached in the same manner from either the front or the back of the retaining part 6.

The blade plate 10 is formed as a metal plate made from stainless steel, on which a multiplicity of food preparation blades 12 are formed. The use of metals other than stainless steel does not present a problem. The side of the blade plate 10 that comes into contact with the food is the front side, and the blade plate 10 is warped so that the traverse section thereof forms an arch that is convex on the front side. The thickness of the blade plate 10 is preferably 0.1 mm to 1 mm. The blade plate 10 is not limited to a metal plate, and may, for example, be made from plastic.

Figure 1:
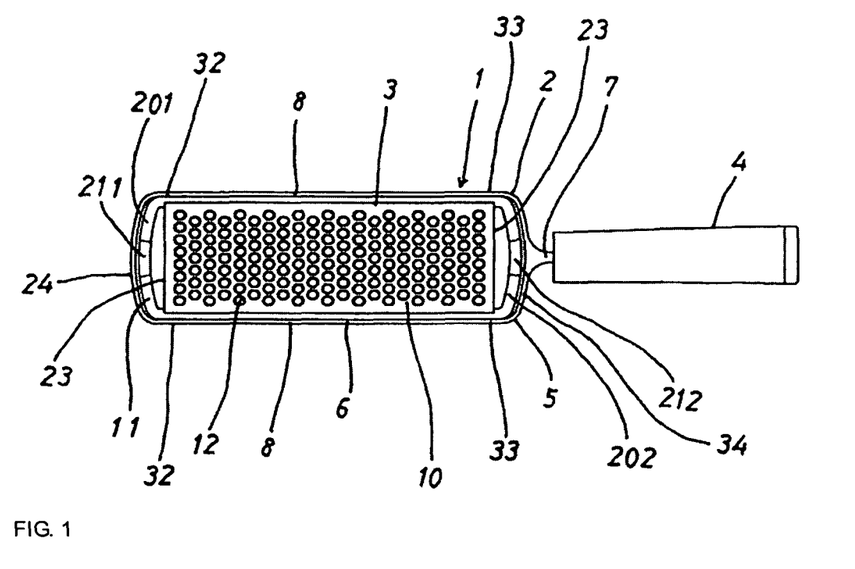
FIG. 1 is a front view of the present invention.
Figure 2:
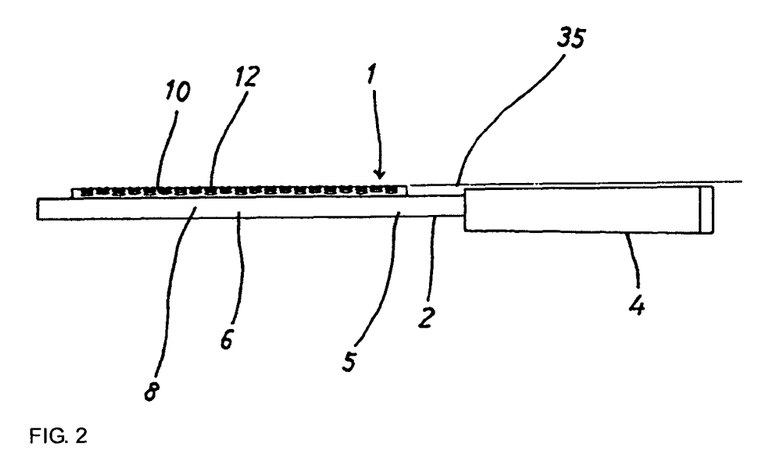
FIG. 2 is a side view of the present invention.
Figure 3:
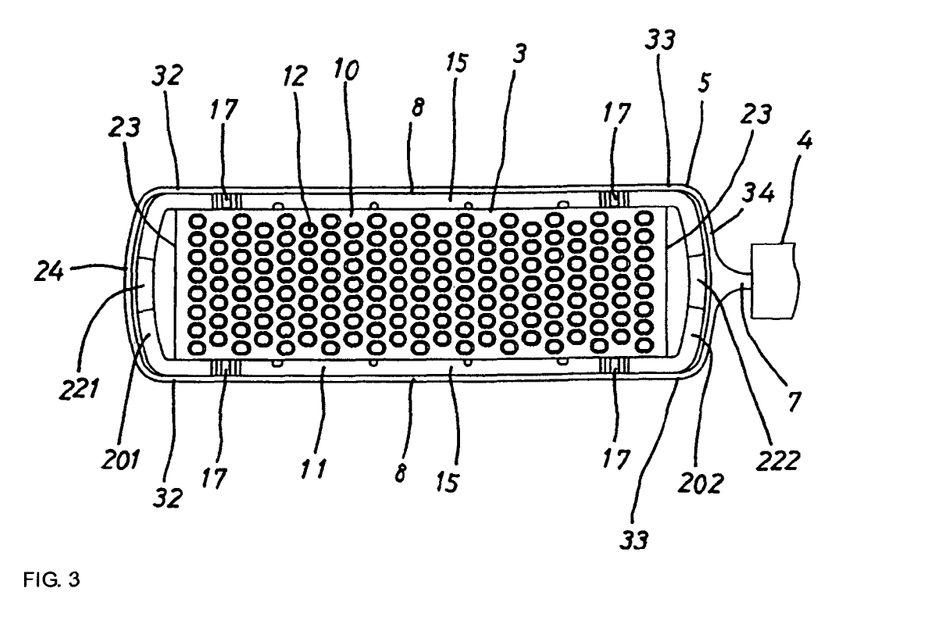
FIG. 3 is a partial back view of the present invention.

As shown in FIG. 8, the blade plate 10 is bent so as to have a section in the shape of square-cornered U, with lateral pieces 16, 16 formed at both sides, and these two lateral pieces 16, 16 are embedded in the two side pieces 15, 15 of the frame member 11, whereby the blade plate 10 is attached to the frame member 11. In terms of the method of attaching the blade plate 10 on the frame member 11, the two lateral pieces 16, 16 of the blade plate 10 are fixed in place within a mold that serves to form the frame member 11, and plastic is injected into the mold so as to form the frame member 11 with the two lateral pieces 16, 16 embedded in the two side pieces 15, 15 of the frame member 11, whereby the frame member 11 is formed with the blade plate 10 attached. The blade plate 10 that is attached is shorter than the frame member 11 so that the forward and rear edges 23, 23 of the blade plate 10 do not reach the forward and rear end pieces 201, 202 of the frame member 11. Accordingly, a portion of the space that is surrounded by the frame member 11 can be seen between the edge 23 of the blade plate 10 and the frame member 11. The blade plate 10 has a total length of approximately 154 mm, and a length of approximately 54 mm in the crosswise direction, with the vertical lengths of the lateral pieces 16 being approximately 7.9 mm. Furthermore, the traverse section of the blade plate 10 is warped into an arch, this arch being a circular arch, and the diameter of the circular arch formed on the back side of the blade plate 10 is approximately 75 mm. Because this is a circular arch, the center of the blade plate 10 is at the highest position with respect to the plane constituted by the retaining part 6. Furthermore, as shown in FIG. 2, a line of extension 35 from the centerline in the lengthwise direction of the blade plate 10 extends above the top face of the handle 4. Specifically, this indicates that the horizontal plane that includes the highest position on the top face of the retained food preparation plate 3 is higher than the horizontal plane that includes the highest position of the handle 4.

A cover 25 can be removably attached to the food preparation plate 3, so as to substantially entirely cover the blade plate 10. The majority of the cover 25 consists of an arched surface portion 26. The arched surface portion 26 is warped so that the traverse section thereof forms an arch that is convex on the front side. Here, this arch is a circular arch, and the diameter of the circular arch is slightly greater than the diameter of the circular arch of the blade plate 10. This arched surface portion 26 covers the entire surface of the blade plate 10. Locking pieces 28 are integrally formed at the centers of both the forward and rear ends 27, 27 of the arched surface portion 26. A locking protrusion 29 is integrally formed on the inner face of the locking piece 28. Furthermore, stopper pieces 30, 30 are formed on both sides of the locking pieces 28 at both the forward and rear ends 27, 27 of the arched surface portion 26. The thickness of the locking piece 28 is less than the thickness of the stopper pieces 30. Side walls 31, 31 are erected oriented towards the back side of the arched surface portion 26, on both sides thereof.

When the cover 25 is to be attached to the blade plate 10, for example, the cover 25 is placed on the blade plate 10, the locking protrusion 29 on one of the locking pieces 28 is engaged on the back side of the edge 23 of the blade plate 10, and as a result of pressing downward on the other locking piece 28, the locking piece 28 flexes, whereby the other locking protrusion 29 passes over the other edge 23 of the blade plate 10, and engages on the back side of the edge 23. As another method of attachment, the cover 25 is placed on the blade plate 10, the locking protrusion 29 on one of the locking pieces 28 is engaged on the back side of the edge 23 of the blade plate 10, the other locking piece 28 is flexed outward with a finger and moved towards the back side, whereby the other locking protrusion 29 engages on the back side of the edge 23. As shown in FIG. 8, the two side walls 31, 31 of the cover 25 that has been attached to the blade plate 10 make contact with the two side pieces 15, 15 of the frame member 11 of the food preparation plate 3, whereby a predetermined distance is maintained between the arched surface portion 26 of the cover 25 and the blade plate 10, so that the cover 25 does not touch the front face of the blade plate 10. Furthermore, the outer edges the stopper pieces 30, 30 make contact with the inner faces of the two side pieces 15, 15 of the frame member 11, so that sideways movement of the cover 25 can be prevented. Because the cover 25 is quadrilaterally symmetrical, the cover 25 can be attached to the food preparation plate 3, even if it is front/rear reversed. Furthermore, the cover 25 is made out of a transparent material, and therefore it is possible to recognize the type of the food preparation blades 12 without removing the cover 25. However, it is a matter of course that the cover 25 is not limited to a configuration of this sort.

Next, an example of a method of retaining the food preparation plate 3 in the retaining part 6 without the cover 25 attached is described. One method is to first grasp the handle 4 with a hand, so as to hold the food preparation device main body 2 in the hand. Next, the back of the food preparation plate 3 is brought so as to face the retaining part 6 and the four engagement recesses 17 on the frame member 11 are placed over the four engagement protrusions 91, 92 on the retaining part 6. At this time, because the engagement recesses 17 are not elastically opened, the engagement protrusions 91, 92 can be placed against the engagement recesses 17, without engaging in the engagement recesses 17. Consequently, the bottom half of the frame member 11, from the horizontal centerline downwards, is accommodated at the interior of the retaining part 6, so that the bottom half of the outer peripheral face 13 of the frame member 11 and the top half of the inner peripheral face 14 of the retaining part 6 face each other with a slight gap therebetween. In this manner, positioning of the food preparation plate 3 is completed, and the direction in which the food preparation plate 3 is to be pushed is determined. Next, the thumb of the hand that is gripping the handle 4 is placed in the depression 212 on the front side of the rear end piece 202 of the frame member 11, and with the index finger of the other hand placed on the back side of the forward end piece 24 of the retaining part 6, the thumb of that hand is placed in the hollow 211 on the front side of the forward end piece 201 of the frame member 11, and the forward and rear hollows 211, 212 are simultaneously pressed in the direction of the back side by the two thumbs. Consequently, the engagement recesses 17 elastically open, so that the food preparation plate 3 can be moved in translation in the direction of the back side at the interior of the retaining part 6, and the engagement protrusions 91, 92 engage in the bottoms 18 of the engagement recesses 17, whereby the food preparation plate 3 is retained in the retaining part 6. Because the food preparation plate 3 can be attached to the retaining part 6 by moving the food preparation plate 3 in translation by an amount equal to the depth of the engagement recesses 17, it is possible to rapidly attach the food preparation plate 3. Furthermore, as described above, the length of the blade plate 10 is shorter than the length of the frame member 11, so that the forward and rear edges 23, 23 of the blade plate 10 do not reach the forward and rear end pieces 201, 202 of the frame member 11, so that a portion of the space that is surrounded by the frame member 11 is visible between the edge 23 of the blade plate 10 and the frame member 11. Accordingly, it is possible to attach the food preparation plate 3 simply by pressing at a place that is distant from the edge 23 of the food preparation blades 12, and therefore the food preparation plate 3 can be attached safely, without the risk of fingers touching the food preparation blades 12. Note that, it is a matter of course that translational motion cannot necessarily and automatically be achieved by pressing the hollows 211, 212 in the food preparation plate 3. If these are not pressed at the same time, or if there is a significant difference in the strength with which the two are pressed, translational motion cannot be achieved. However, the effect of the present invention can be achieved by correcting this sort of handling.

Next, another method of retaining the food preparation plate 3 in the retaining part 6 without the cover 25 attached is described. First, the food preparation plate 3 is placed on a countertop with the front face thereof oriented downward. Next, the retaining part 6 for the food preparation plate 3 is held between the index finger and the thumb of one hand in the vicinity of the forward end portions 32, 32 of both the side pieces 8, 8, and between the index finger and the thumb of the other hand, in the vicinity of the rear end portions 33, 33 of both the side pieces 8, 8. Next, the upwardly facing back side of the food preparation plate 3 and the retaining part 6 are brought so as to face each other, and the four engagement protrusions 91, 92 on the retaining part 6 are placed on the four engagement recesses 17 in the frame member 11. Next, in this state, the retaining part 6 is simultaneously pushed downwards with both hands. Consequently, the engagement recesses 17 elastically open, so that the food preparation plate 3 can be moved in translation in the direction of the back side, at the interior of the retaining part 6, and the engagement protrusions 91, 92 engage in the bottoms 18 of the engagement recesses 17, whereby the food preparation plate 3 is retained in the retaining part 6. At this time, as described above and as shown in FIG. 2, a line of extension 35 from the centerline in the lengthwise direction of the blade plate 10 extends above the top face of the handle 4. Accordingly, a gap is maintained between the countertop and the handle 4, until the food preparation plate 3 is completely retained in the retaining part 6, and consequently the handle 4 will not come into contact with the surface of the countertop while the retaining part 6 is being pushed downwards, whereby it is possible to completely achieve translational motion of the food preparation plate 3 with respect to the retaining part 6. Thus, because the food preparation plate 3 can be attached to the retaining part 6 by moving the food preparation plate 3 in translation by an amount equal to the depth of the engagement recesses 17, it is possible to rapidly attach the food preparation plate 3. Furthermore, the attachment work can be performed in an extremely safe manner because, when the engagement protrusions 91, 92 engage in the engagement recesses 17, the food preparation plate 3 remains resting on the countertop, and therefore will not be touched by the hands.

Next, one example of a method of detaching the food preparation plate 3 that has been retained on the retaining part 6 is described. First, the handle 4 is gripped by the hand so as to hold the food preparation device main body 1 with the back face of the food preparation plate 3 is oriented so as to face the person, or upward. Next, the thumb of the hand that is holding the handle 4 is placed in the depression 222 on the back face at the rear of the frame member 11, then with the index finger of the other hand placed on the forward end piece 24 of the retaining part 6, the thumb of that hand is placed in the depression 221 on the back side at the forward end, and the forward and rear depressions 221, 222 are simultaneously pushed in the direction of the front side by the two thumbs. Consequently, the engagement recesses 17 elastically open and the food preparation plate 3 can be moved in translation in the direction of the front side within the retaining part 6, so that the engagement protrusions 91, 92 are released from the engagement recesses 17, whereby the food preparation plate 3 can be detached from the retaining part 6. Because the food preparation plate 3 can be detached by moving the food preparation plate 3 in translation by an amount equal to the depth of the engagement recesses 17, it is possible to rapidly detach the food preparation plate 3. Furthermore, because it is possible to detach the food preparation plate 3 simply by pressing at places that are distant from the food preparation blades 12, it can be detached safely, without the risk of fingers touching the food preparation blades 12.

The attachment and detachment of the food preparation plate 3 described above can be performed with the cover 25 attached to the food preparation plate 3. In this case, because the food preparation blades 12 are covered by the cover 25 and therefore not exposed, the work can be performed in an extremely safe manner, without the risk of injuring fingers or the like. Furthermore, when the food preparation plate 3 is attached to the retaining part 6 with the food preparation plate 3 placed on a countertop with the front face thereof oriented downwards, the food preparation blades 12 do not make contact with the counter top, and therefore damage to the food preparation blades 12 can be prevented.

Note that the present invention can be embodied in various different modes based on the configuration described above. For example, rather than serving as a food grater, the food preparation device 1 may be a slicer or the like. The food preparation plate may be integrally formed from plastic. In this case, the food preparation blades may be formed integrally therewith, or the food preparation blades may be formed separately, with these alone being made from metal or the like. The shapes of the food preparation plate 3 and the retaining part 6 are not limited to rectangles that are forward/rear elongate, but rather may be transversely elongate rectangles or maybe shapes other than rectangular. Rather than the blade plate 10 having a transverse section forming in arch that is convex on the front side, the blade plate 10 may be flat, or maybe a concave arch. If, rather than an arched surface, the blade plate 10 is a flat plane, the vertical width of the frame member 11 should be increased so that the blade plate 10 has a more elevated structure, in order that the horizontal plane that includes the highest position on the front side of the food preparation plate 3 retained in the retaining part 6 is positioned higher than the horizontal plane that includes the highest position on the handle 4.

By configuring a replaceable blade type food preparation device in accordance with the present invention, a food preparation device can be provided that combines safety and speed in the attachment and detachment of food preparation plates.

EXPLANATION OF THE REFERENCE NUMERALS 1 food preparation device
2 food preparation device main body
3 food preparation plate
4 handle
5 retaining device
6 retaining part
7 insertion projection
8 retaining part side piece
91 engagement protrusion
92 engagement protrusion
10 blade plate
11 frame member
12 food preparation blade
13 outer periphery of the frame member
14 inner peripheral face of the retaining unit
15 frame member side piece
16 lateral piece of the blade plate
17 engagement recess
18 bottom of the engagement recess
19 notch
201 forward end piece of the frame member 202 rear end piece of the frame member
211 depression
212 depression
221 depression
222 depression
23 edge of the blade plate
24 forward end piece of the retaining part
25 cover
26 arched surface portion
27 end of the arched surface portion
28 locking piece
29 locking protrusion
30 stopper piece
31 side wall
32 forward end portion of the retaining part side piece
33 rear end portion of the retaining part side piece
34 rear end piece of the retaining part
35 line of extension

The invention claimed is:

1. A food preparation device comprising:
a food preparation device main body; a food preparation plate detachably attached to the food preparation device main body, and a cover; and
wherein the food preparation device main body includes a handle, and a holding apparatus for the food preparation plate, the holding apparatus having a holding part that detachably holds the food preparation plate and which is attached to the handle;
wherein a locking means for holding the food preparation plate is provided between the food preparation plate and the holding part;
wherein the food preparation plate includes a knife blade with a food preparation blade on a surface;
wherein the cover is formed to a shape that covers the entire surface of the knife blade, and is detachable with regards to the food preparation plate; and
wherein the food preparation plate can be attached and detached to the food preparation device main body while the cover is attached to the food preparation plate.

2. The food preparation device of claim 1, wherein the food preparation plate is detachably attached to the food preparation device main body even when the cover is not attached to the food preparation plate.

3. The food preparation device of claim 1, wherein locking pieces that extend downward on both end parts of the cover are integrally formed, a locking protrusion on the inner surface of these locking pieces is integrally formed, and the cover is detachably attached to the food preparation plate by locking the locking protrusions to the back surface of the end edge of the knife blade.

4. The food preparation device of claim 3, wherein locking pieces are formed at the center of both end parts of the cover, and a pair of stopper pieces is formed on both sides of the locking pieces.

5. The food preparation device of claim 2, wherein locking pieces that extend downward on both end parts of the cover are integrally formed, a locking protrusion on the inner surface of these locking pieces is integrally formed, and the cover is detachably attached to the food preparation plate by locking the locking protrusions to the back surface of the end edge of the knife blade.

6. The food preparation device of claim 5, wherein locking pieces are formed at the center of both end parts of the cover, and a pair of stopper pieces is formed on both sides of the locking pieces.

7. The food preparation device of claim 1, wherein a predetermined distance is provided between the cover that is attached to the food preparation plate and the knife blade, and the inner surface of the cover does not contact the surface of the knife blade.

8. The food preparation device of claim 2, wherein a predetermined distance is provided between the cover that is attached to the food preparation plate and the knife blade, and the inner surface of the cover does not contact the surface of the knife blade.

9. The food preparation device of claim 3, wherein a predetermined distance is provided between the cover that is attached to the food preparation plate and the knife blade, and the inner surface of the cover does not contact the surface of the knife blade.

10. The food preparation device of claim 4, wherein a predetermined distance is provided between the cover that is attached to the food preparation plate and the knife blade, and the inner surface of the cover does not contact the surface of the knife blade.

11. The food preparation device of claim 5, wherein a predetermined distance is provided between the cover that is attached to the food preparation plate and the knife blade, and the inner surface of the cover does not contact the surface of the knife blade.

12. The food preparation device of claim 6, wherein a predetermined distance is provided between the cover that is attached to the food preparation plate and the knife blade, and the inner surface of the cover does not contact the surface of the knife blade.

* * * * *